US006799022B1

(12) United States Patent
Krawinkel

(10) Patent No.: US 6,799,022 B1
(45) Date of Patent: Sep. 28, 2004

(54) INPUT CIRCUIT FOR FM/AM RADIO RECEIVER

(75) Inventor: Bernward Krawinkel, Hildescheim/Sorsum (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,785

(22) PCT Filed: Oct. 16, 1999

(86) PCT No.: PCT/DE99/03331

§ 371 (c)(1),
(2), (4) Date: Oct. 23, 2000

(87) PCT Pub. No.: WO00/35078

PCT Pub. Date: Jun. 15, 2000

(30) Foreign Application Priority Data

Dec. 7, 1998 (DE) .......................... 198 56 284

(51) Int. Cl.[7] ................................. H04B 1/18
(52) U.S. Cl. .................. 455/180.1; 455/191.1; 455/191.3
(58) Field of Search .................. 455/93, 142, 143, 455/180.1, 82, 188.1, 132, 280, 160.1, 283, 140, 286, 575.1, 287, 550.1, 289, 269, 272, 290, 275, 340, 334, 193.1, 191.1, 191.3; 343/700, 715, 745, 858, 749, 750, 850; 333/24 R, 1, 101, 109; 307/112, 146; 348/729, 731, 733

(56) References Cited

U.S. PATENT DOCUMENTS 4,037,177 A * 7/1977 Tyrey .......................... 333/32

4,525,869 A 7/1985 Hamada et al.
4,656,364 A * 4/1987 Yokogawa et al. ......... 307/112
5,937,337 A * 8/1999 Marrah et al. .............. 455/142
6,456,832 B1 * 9/2002 Yanagisawa et al. ..... 455/193.1

FOREIGN PATENT DOCUMENTS

| DE | 20 56 073 | 3/1972 | |
|---|---|---|---|
| EP | 0 575 203 | 12/1993 | |
| EP | 0575203 A1 * | 12/1993 | ............ H04B/7/08 |
| EP | 0 823 751 | 2/1998 | |
| JP | 63181531 | * 7/1988 | |

* cited by examiner

Primary Examiner—Edward F. Urban
Assistant Examiner—C. Chow
(74) Attorney, Agent, or Firm—Kenyon & Kenyon

(57) ABSTRACT

An input circuit for an AM/FM radio receiver having an FM intermediate frequency rejection circuit and an AM image frequency rejection circuit, an FM input circuit for receiving frequency-modulated input signals and an AM input circuit for receiving amplitude-modulated input signals, and PIN diodes are provided for switching from AM operation to FM operation between the FM intermediate frequency rejection circuit and the AM image frequency rejection circuit. The PIN diodes connect the FM intermediate frequency rejection circuit for high-frequency signals to ground when FM operation is selected, and a control voltage is applied to the switching device for providing automatic gain control between the FM intermediate frequency rejection circuit and the AM image frequency rejection circuit when AM operation is selected.

8 Claims, 1 Drawing Sheet

INPUT CIRCUIT FOR FM/AM RADIO RECEIVER

The present invention relates to an input circuit for an AM/FM radio receiver having an AM/FM intermediate frequency of 10.7 MHz, having a circuit for selecting the FM frequency away from the AM frequency at the antenna input, having an FM intermediate frequency rejection circuit at the output of the circuit for selecting the FM frequency away from the AM frequency including a rejection circuit for AM image frequency rejection, having an FM input circuit for reception of frequency-modulated input signals and having an AM input circuit for reception of amplitude-modulated input signals.

BACKGROUND INFORMATION

Radio receivers having optional AM operation (amplitude modulation) and FM operation (frequency modulation) may have both AM and FM preselector stages downstream from a common preselection filter at the antenna input. The AM preselector stage includes an AM high frequency (HF) selection circuit and the FM preselector stage includes at least one FM HF selection circuit. When the AM and FM preselector stages are connected, both preselector stages must be well isolated from one another to guarantee good reception quality for each reception range. In particular, the AM preselector stage should not represent any significant capacitive load for the FM preselector stage in this regard.

SUMMARY OF THE INVENTION

An object of an exemplary embodiment of the present invention is to provide a rejection circuit for each reception range so that the FM input circuit and the AM input circuit remain well isolated from one another with either FM or AM operation selected. FM intermediate frequency immunity is to be increased and AM image frequency immunity is to be expanded.

In an input circuit according to an exemplary embodiment o the present invention, an AM image frequency rejection circuit is connected downstream from the FM intermediate frequency rejection circuit, and PIN diodes for switching from AM to FM operation are provided between the FM intermediate frequency rejection circuit and the AM image frequency rejection circuit, with the PIN diodes connecting the FM intermediate frequency rejection circuit to ground for high-frequency signals when FM operation is selected, whereas in AM operation a control voltage for automatic gain control (AGC) is provided on the switching device and is applied between the FM intermediate frequency rejection circuit and the AM image frequency rejection circuit.

FM and AM preselector stages are operated in alternation with PIN diodes. Due to the HF grounding of the FM intermediate frequency rejection circuit and of the AM image frequency rejection circuit connected to it, the AM preselector stage is uncoupled and the FM intermediate frequency rejection circuit is operated as an acceptor circuit. It is believed that FM intermediate frequency immunity is thus greatly increased.

When the input circuit is switched to AM operation using the throw-over switch, the amplitude-modulated high-frequency signal goes to the AM image frequency rejection circuit, so that interference frequencies of this frequency range upstream from the active AM preselector stage are believed to be greatly reduced in an advantageous manner, and selectivity demand downstream from the AM preselector stage can be reduced. Upstream from the AM image frequency rejection circuit, the amplitude-modulated high-frequency signal is sent through the FM intermediate frequency rejection circuit which reduces FM interference signals through coil $L_1$ of the FM intermediate frequency rejection circuit in AM operation and then functions as a capacitive coupling at its output $C_1$. Due to the fact that the AM image frequency rejection circuit is connected upstream from the active AM preselector stage, AM image frequency immunity is also believed to be greatly improved in an advantageous manner.

The FM intermediate frequency rejection circuit may include a series connection of a coil and a capacitor. In AM operation, the capacitor then assumes the function of capacitive coupling of the AM preselector stage to the preselection filter.

The AM image frequency rejection circuit may include a parallel circuit of a coil and a capacitor and have the function of a frequency band-stop filter.

The FM intermediate frequency rejection circuit and the AM image frequency rejection circuit are connected in series in a particular embodiment, with the PIN diodes connected to the tie point of the series circuit. The first PIN diode is connected to ground in the forward direction, and the second PIN diode is connected to a control voltage in the forward direction. To do so, the anode of the first PIN diode is connected to the tie point of the series circuit, and the cathode of the first PIN diode is connected to ground. The cathode of the second PIN diode is also connected to the tie point of the series circuit, and the anode of the second PIN diode may be connected to the control voltage across a resistor. The anode of the second PIN diode must also be connected to ground via a capacitor.

Commercially available PIN diodes may behave like ordinary diodes at low frequencies, having a low loss and a low junction capacitance. At higher frequencies, PIN diodes may no longer have a rectifier effect, but they may behave like a resistor, whose resistance decreases with an increase in conducting-state current. Then if a constant voltage is applied to the second PIN diode, both PIN diodes have a HF connection in the forward direction. The HF parallel circuit of the very low-resistance equivalent resistors of the PIN diodes connects the FM intermediate frequency rejection circuit directly to ground. Thus the AM preselector stage is completely isolated as soon as FM operation is selected by a constant control voltage applied to the second PIN diode. When a known control voltage is applied to the second PIN diode in AM reception for automatic gain control (AGC), both PIN diodes operate in high-frequency mode and behave like resistors. Then the FM intermediate frequency rejection circuit no longer has high frequency grounding by the parallel circuit of PIN diodes and it behaves only as a capacitive connection having properties for selecting away from the downstream AM image frequency rejection circuit and the AM preselector stage.

BRIEF DESCRIPTION OF THE DRAWING

The FIGURE shows a schematic diagram of an exemplary embodiment of the present invention, including an antenna input circuit for an AM/FM radio receiver.

DETAILED DESCRIPTION

Figure 1:
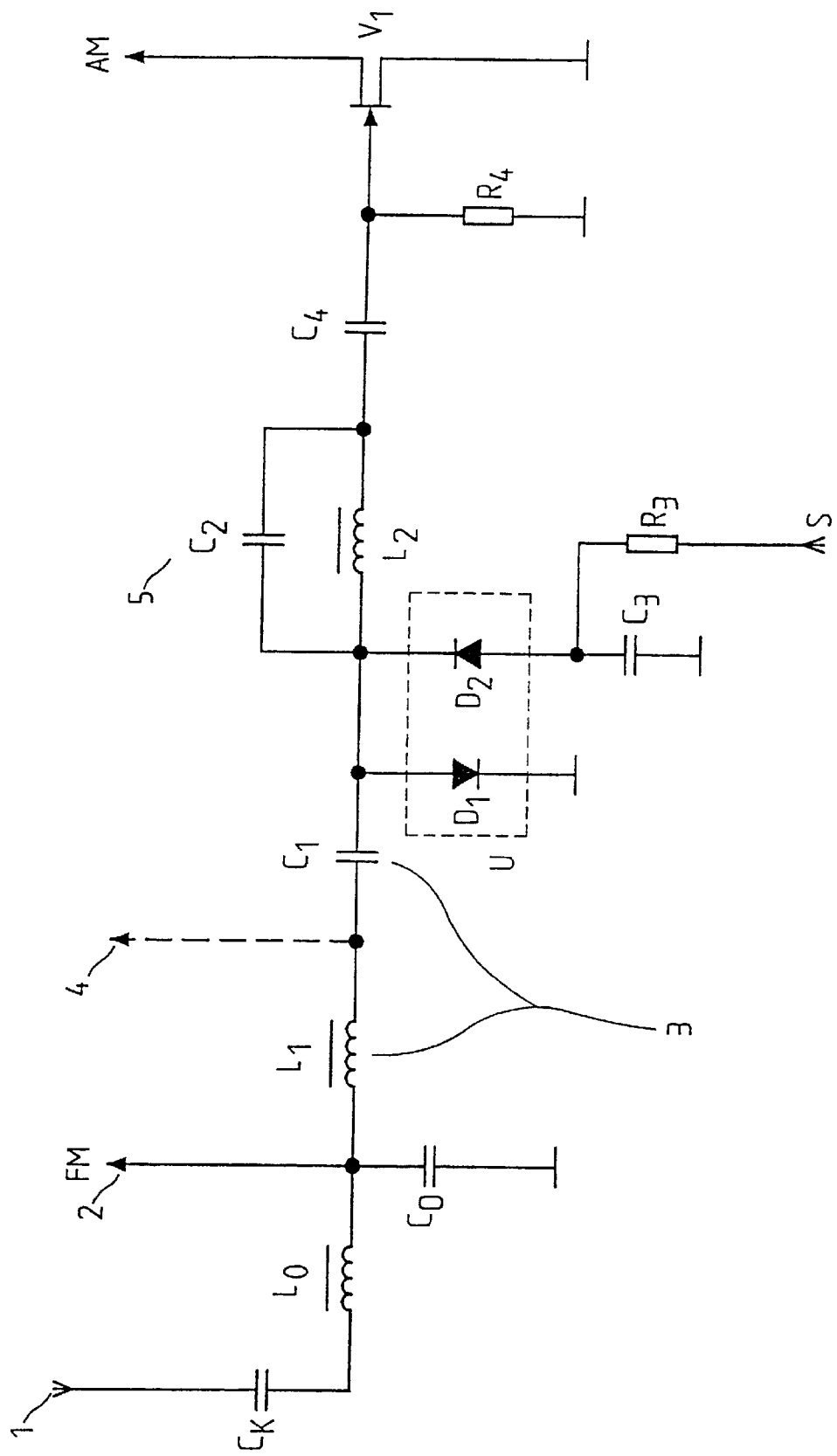

An LC low-pass filter for selecting the FM frequency away from the AM frequency is connected to a receiving antenna 1. The LC low pass filter includes a capacitor $C_k$ and a coil $L_o$, in which the coil $L_o$ is connected in series downstream from the capacitor $C_k$ (which is connected or coupled to the receiving antenna 1), and a capacitor $C_o$ (which is connected downstream of the coil $L_o$) is connected or coupled to ground. An FM preselector stage 2 is connected to the output of the LC low-pass filter. In addition, an FM intermediate frequency rejection circuit 3, which is connected downstream from the LC low-pass filter includes a series connection of a coil $L_1$ and a capacitor $C_1$. A known circuit may be connected between these elements of the series circuit as a lighting protection 4. A switching device U is provided downstream from FM intermediate frequency rejection circuit 3 as a PIN diode pair $D_1$, $D_2$ in a series circuit, with a first PIN diode $D_1$ connected to ground in the forward direction. To do so, the cathode of first PIN diode $D_1$ is connected to ground. A second PIN diode $D_2$ is connected to a control voltage across a resistor $R_3$ in the forward direction. The cathode of second PIN diode $D_2$ is connected to the output of FM intermediate frequency rejection circuit 3. The anode of second PIN diode $D_2$ is connected to a capacitor $C_3$ at the ground point.

The control signal for AM operation is generated in a known way and used for automatic gain control AGC so that the AM receiving circuit is not overdriven in the presence of strong inband interference sources. A field-dependent d.c. voltage is then used as the controlled variable.

An AM image frequency rejection circuit 5 is provided directly downstream from FM intermediate frequency rejection circuit 3, forming a band-stop filter through parallel connection of a capacitor $C_2$ and a coil $L_2$. Downstream from this AM image frequency rejection circuit 5 is connected an AM preselector stage having a series capacitor $C_4$, a resistor $R_4$ (which is subsequently connected to ground) and a field effect transistor $V_1$.

If the antenna input circuit is used in FM operation, then a constant voltage is applied to a second PIN diode $D_2$ across resistor $R_3$. Therefore, both PIN diodes $D_1$ and $D_2$ have a very low resistance. In addition, they are in parallel for the HF signal. They thus connect FM intermediate frequency rejection circuit 3 to ground. FM intermediate frequency rejection circuit 3 therefore functions as an IF acceptor circuit. It is usually designed for the traditional FM intermediate frequency of 10.7 MHz.

In AM operation, a control voltage is applied to second PIN diode $D_2$ for automatic gain control, resulting in the differential resistance of diodes $D_1$, $D_2$ being determined by the intensity of the HF signal. In a control case, they then form resistors, which has the result that FM intermediate frequency rejection circuit 3 is high and functions only as capacitive coupling of the downstream AM input circuit and as a filter circuit to a certain extent.

Due to the HF grounding of the output of FM intermediate frequency rejection circuit 3 in FM operation, the capacitances of the AM input circuit do not affect the FM preselector stage, so that AM image frequency rejection circuit 5 can be placed upstream from the active AM preselector stage. This greatly expands AM image frequency immunity, and the selection demand downstream from the AM preselector stage can be reduced.

What is claimed is:

1. A input circuit arrangement for an AM/FM radio receiver, the AM/FM radio receiver having an FM input circuit for receiving FM input signals, and an AM input circuit for receiving AM input signals, the input circuit arrangement comprising:

a circuit for selecting an FM frequency away from an AM frequency at an antenna input, the circuit for selecting having an output;

an FM intermediate frequency rejection circuit having another output and being coupled to the output of the circuit for selecting the FM frequency away from the AM frequency;

an AM image frequency rejection circuit coupled downstream from the FM intermediate frequency rejection circuit; and a plurality of PIN diodes for switching between AM operation and FM operation, wherein:
at least one of the plurality of PIN diodes connects the another output of the FM intermediate frequency rejection circuit for high-frequency signals to ground for FM operation; and
a control voltage is applied to at least one of the plurality of PIN diodes for providing automatic gain control between the FM intermediate frequency rejection circuit and the AM image frequency rejection circuit for AM operation.

2. The input circuit arrangement of claim 1, wherein the FM intermediate frequency rejection circuit includes a coil and a capacitor connected in series, the capacitor being provided for capacitively connecting the AM image frequency rejection circuit to the circuit for selecting the FM frequency away from the AM frequency in AM operation.

3. The input circuit arrangement of claim 1, wherein the AM image frequency rejection circuit includes a coil and a capacitor connected in series.

4. The input circuit arrangement of claim 1, wherein the plurality of PIN diodes are connected at a point between the FM intermediate frequency rejection circuit and the AM image frequency rejection circuit, one of the plurality of PIN diodes being connected to ground in a forward direction, and another of the plurality of PIN diodes being coupled to the control voltage in the forward direction.

5. The input circuit arrangement of claim 4, wherein an anode of the another of the plurality of PIN diodes is connected to ground with another capacitor, differential resistances of the plurality of PIN diodes being in parallel for the high-frequency signals.

6. The input circuit arrangement of claim 4, wherein the control voltage is constant in FM operation and is variable in AM operation for providing automatic gain control as a function of a field strength directional voltage.

7. The input circuit arrangement of claim 1, wherein the plurality of PIN diodes is two PIN diodes.

8. The input circuit arrangement of claim 1, wherein:
the FM intermediate frequency rejection circuit and the AM image frequency rejection circuit form a series circuit, and
the plurality of PIN diodes are connected to a tie point of the series circuit.

* * * * *

UNITED STATES PATENT AND TRADEMARK OFFICE
CERTIFICATE OF CORRECTION

PATENT NO. : 6,799,022 B1
DATED : September 28, 2004
INVENTOR(S) : Bernward Krawinkel It is certified that error appears in the above-identified patent and that said Letters Patent is hereby corrected as shown below:

Column 1,
Line 3, insert heading -- FIELD OF THE INVENTION --.

Column 2,
Line 21, change "in a particular embodiment," to -- in an exemplary embodiment, --.
Line 38, change "like a resistor," to -- like an equivalent resistor, --.

Signed and Sealed this

Twenty-seventh Day of September, 2005

JON W. DUDAS
*Director of the United States Patent and Trademark Office*